Figure 1:
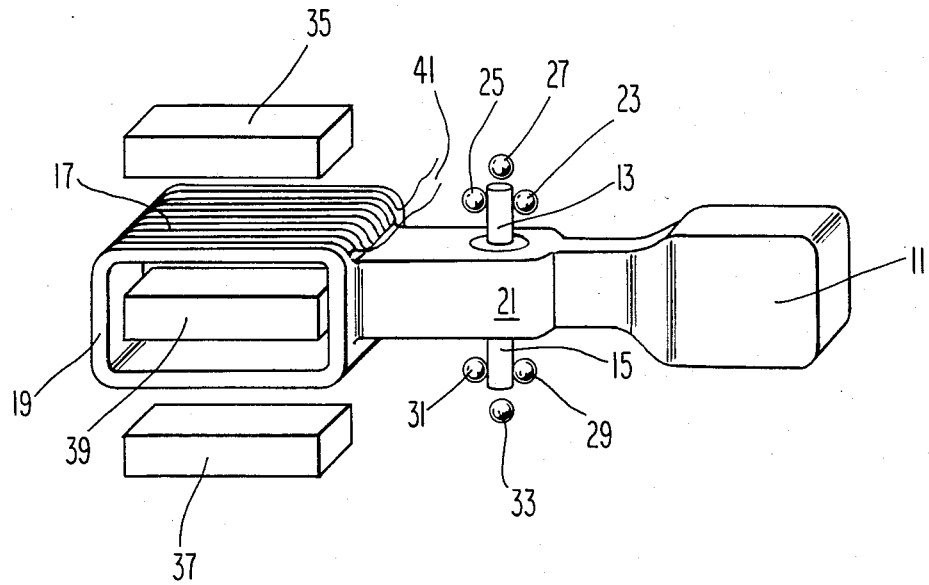

United States Patent [19]

Stratton et al.

[11] Patent Number: 4,495,815
[45] Date of Patent: Jan. 29, 1985

[54] MASS AND COIL ARRANGEMENT FOR USE IN AN ACCELEROMETER

[75] Inventors: Leo M. Stratton, West Chester; Kenneth J. Sipple, Chester Heights, both of Pa.; Mario B. Tatonetti, Voorhees, N.J.

[73] Assignee: Columbia Research Laboratories, Inc., Woodlyn, Pa.

[21] Appl. No.: 443,949

[22] Filed: Nov. 23, 1982

[51] Int. Cl.³ .............................................. G01P 15/13
[52] U.S. Cl. .................................................. 73/517 B
[58] Field of Search ................. 73/517 B, 514, 516 R, 73/517 R

[56] References Cited

U.S. PATENT DOCUMENTS

| | | | |
|---|---|---|---|
| 3,071,008 | 1/1963 | Steele | 73/517 B |
| 3,130,589 | 4/1964 | Sawyer | 73/497 |
| 3,176,521 | 4/1965 | Clark | 73/517 B |
| 3,186,504 | 6/1965 | Wilgen | 73/517 B X |
| 3,246,525 | 4/1966 | Clark | 73/517 B |
| 3,355,952 | 12/1967 | Romberg | 73/517 B X |
| 3,395,583 | 8/1968 | Bartholomew | 73/514 |
| 3,897,690 | 8/1975 | Hanson | 73/517 B |

Primary Examiner—James J. Gill
Attorney, Agent, or Firm—William E. Cleaver

[57] ABSTRACT

The present invention employs a material mass to respond to forces, such as gravity, and the material mass is secured through an intermediate beam, or arm, to a wire coil. The intermediate arm has upper and lower shafts secured thereto, which, when mounted in some form of bearing means, permit the arm, or beam, to rotate, thereby rotating the mass and the wire coil, in response to forces applied to the material mass and forces applied to the wire coil. The coil is formed to pass through a narrow gap between a pair of permanent magnets whereby the coil is subjected to a high density magnetic flux.

3 Claims, 2 Drawing Figures

MASS AND COIL ARRANGEMENT FOR USE IN AN ACCELEROMETER

BACKGROUND

Accelerometers have come to be used not only as a means for detecting changes in velocity of a device to which they are attached (the host device) but also as a means for detecting the position, or attitude, of a device to which they are attached. Accelerometers of the type under consideration, operate such that a mass of material, very often aluminum, is mounted to be free to rotate and does rotate in response to forces applied thereto. Such forces being exemplified by the force to overcome inertia in response to a change in velocity, or exemplified by the force of gravity, when the position of the host device is of interest, etc. In the prior art the mass is attached directly to a wire coil, which is electrically energized, and the wire coil is held on a frame which is rotatably mounted. The frame has a pivot like means on the top and bottom and these pivots are mounted in associated cup jewells. In the prior art arrangement a permanent magnet is mounted within the frame so that the magnetic flux emanating from the magnet interlinks the wire coil. In addition a coil is located in a stator means in close proximity to the path of the mass. The stator coil is energized and as the mass moves closer or farther away, more or less eddy currents are generated in the mass which in turn affects the amount of current in the coil. The stator coil is part of a servo circuit. In response to the eddy currents being generated in the mass, the current in the stator coil is varied which in turn provides more or less current (through the servo circuitry) to the wire coil surrounding the magnet. The current from the servo circuit is sometimes referred to as "error" current. Since the wire coil on the frame is interlinked with the magnetic flux from the magnet (within the coil) there is a "motor effect" and the coil moves or tends to move in a direction opposing the movement of the mass. As the mass is moved toward, or away from, the stator coil, the "error" current changes and the motor effect is changed accordingly, until the mass reaches a neutral position. The change in electrical current through the coil on the frame in response to the movement of the mass, with respect to the stator coil, gives a measure of the force applied to the mass. While this prior art arrangement has worked, it has not worked well for any long period of time. As just explained the prior art arrangement had the material mass hanging on the wire coil frame without any counterbalance and hence the lever effect of the material mass acting through the frame (as a lever) applies non symmetrical forces on the pivots, which hold the frame for rotation, and applies non symmetrical forces on the frame per se. Under conditions of vibration and/or shock these non symmetrical forces cause the system to continually go out of adjustment with resultant erroneous measurements of force and/or position. In other words if large forces are applied to the mass in, for instance, a sequence of heavy vibrations, the coil frame per se very often bends, which causes spurious signals. In addition the non symmetrical force applied to the pivots causes the pivots to wear and the jewells in which the pivots are mounted also wear. This excessive wear permits lateral movement and that infirmity gives rise to spurious signals. The present invention overcomes the non symmetrical force effect of the material mass and further provides improved sensitivity.

SUMMARY

The present invention provides a beam means which has two shafts, one on the top of the beam and one on the bottom of the beam. The shafts can be formed from the beam per se, but in the preferred embodiment there is one shaft which passes through, and which is secured to, the beam. The shaft ends are formed to be mounted in a ball bearing housing (in the preferred embodiment) but can be shaped, as in the prior art, like pivots to be mounted in a cup jewell. On the respective two ends of the beam there are mounted a material mass and a wire coil. By mounting the mass and wire coil on opposite ends of the beam, they provide some measure of counterbalance for each other and reduce the effect of the non symmetrical forces of the prior art. The wire coil is formed to be connected to a source of electrical energy. The wire coil is formed to swing, or move, within a gap between two permanent magnets and the coil is further formed to move over a keeper. The two permanent magnets are disposed so that their respective north pole sides lie parallel to the axis of the coil. The keeper acts as a path for magnetic flux emanating from the two permanent magnets. The gap is relatively small and hence the flux density is great, which provides for good sensitivity, signalwise, in response to a small movement of the coil.

The objects and features of the present invention will be better understood from the following description taken in conjunction with the drawings wherein.

Figure 2:
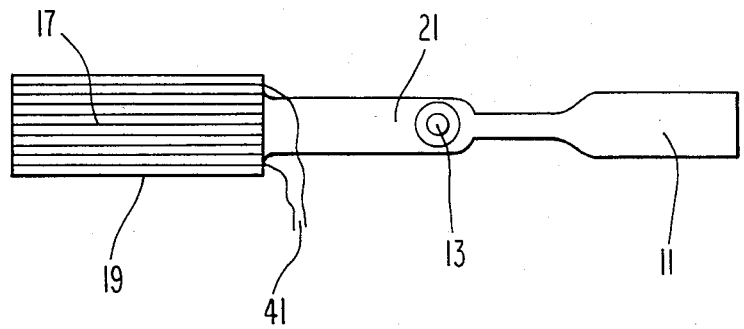

FIG. 1 is a side view of the assembly; and
FIG. 2 is a top view of the assembly.

Consider FIG. 1. In FIG. 1 there is shown a material mass 11. The material mass 11, in the preferred embodiment is fabricated from aluminum but other materials such as brass could be used. In the preferred embodiment the material mass is designed and formed to weigh 50 mg. Other weights could be used as the design point. The beam 21 connects the mass 11 to the coil 17 through the coil frame 19. In the preferred embodiment the beam 21 is fabricated from aluminum, but other rigid materials could be used.

The beam 21 has two shaft ends 13 and 15 protruding therefrom. In the preferred embodiment, a single shaft is located through the beam and the shaft ends are used in place of the pivots of the prior art. Herein lies an advantage over the prior art in that the shaft ends can not be misaligned with one another while the pivots of the prior art are often misaligned. The shaft can be secured in any suitable manner such as with epoxy glue. As is shown in FIG. 1, the shaft ends 13 and 15 are each mounted in associated bearing means. The shaft end 13 is shown mounted in ball bearings 23, 25, and 27. The ball bearing 27 is located at the top of the shaft to limit the vertical movement. Similarly ball bearings 29, 31, and 33 are shown surrounding the shaft end 15. The ball bearing assemblies are not germane to the present invention and it should be noted that cup jewells such as used in the prior art could be employed.

It should also be noted that there are two permanent magnets 35 and 37 disposed, or located to have the coil pass, or move, within the gap between the magnets. The two magnets are formed to have their north pole sides lying parallel to the axis of the coil. As can be gleaned from FIG. 1 there is also a keeper 39 located in the gap between the magnets 35 and 37. The keeper 39 is located so that the coil 17 surrounds the keeper 39 as the coil moves in the gap. In the preferred embodiment the magnets are made of the rare earth cobalt and the keeper is fabricated from steel. The drawing is exaggerated for purposes of description and understanding. In the preferred embodiment the gap is approximately 0.05 inches. The keeper 39 acts as a preferred path for the magnetic flux and hence the density of the magnetic flux located in the gap is high. The coil 17 is electrically energized by connecting a source of electrical power to the leads 41.

In FIG. 2 the coil 17 is shown from the top. The coil 17 is shown mounted on the frame 19. As can be seen in FIG. 2 the beam 21 is thicker at the left hand side of the drawing than it is at the righthand side. The difference in the thickness provides more weight on the coil side to effect some degree of counterbalance. It should be understood that some degree of unbalance is necessary to permit the accelerometer to work.

When a force is applied to the mass 11, the mass tends to rotate around the shaft ends 13 and 15. As the mass moves it will come closer to, or move farther away from, a source of infrared light. The IR light is reflected from the mass and intercepted by an IR detector which generates an electrical signal indicative of the distance of the mass from the source. This IR detecting arrangement is not part of the present invention but is explained to provide an understanding of the utility of the present invention. The signal from the IR detector is transmitted to a servo circuit which in turn transmits electrical current to the wire coil 17. The coil 17 is electrically energized, by electrical current from the servo circuit being passed to the lead wires 41, and as the energized coil passes through the magnetic flux emanating from the magnets 35 and 37, there will be a motor effect which will tend to make the coil oppose the movement of the mass. The mass is then restrained from further movement, slowed down or even moved in the opposite direction until a neutral position is reached. At the neutral position the current in coil 17 is a measure of the force applied to the mass, or the position of the host device.

We have found that by employing the beam arrangement with its mechanical integrity (as opposed to the coil arrangement of the prior art) and with the material mass in some degree of counterbalance with the motor coil that the accelerometer works without the problem of excess wear at the jewells, and without distortion of the coil frame, and with improved sensitivity for long periods of time. By having the relatively small motor coil, which in the preferred embodiment has a cross section of 0.02 square inches, and relatively small cobalt magnets, which in the preferred embodiment each has dimensions of 0.185 inches by 0.085 inches by 0.285 inches, the accelerometer package is greatly reduced in size and the sensitivity greatly improved. In addition by using the beam arrangement we have been able to ruggedize the package so that it finds good application in rugged environments such as being used in drill tools to drill oil wells, and the like.

We claim:

1. A mass and coil assembly for use in the accelerometer comprising in combination: beam means having first and second halves, said beam means formed to have a different mass in its second half than in its first half; responsive mass means formed integral with said first half of said beam; wire coil means secured to said second half of said beam, said wire coil means and said responsive means formed such that said responsive means and said first half of said beam substantially counterbalance said wire coil means and said second half of said beam; first and second shaft means secured on opposing sides of said beam means and disposed to be between said mass means and said coil means and further disposed to lie approximately orthogonal to the axis of said coil so that when forces are applied to said mass means and/or said coil means, said assembly will rotate about said first and second shaft means; and a pair of magnets each of which is formed to have a length dimension, a width dimension and a depth dimension, and formed to have magnetic flux emanating from a first area defined by its width and length dimensions, and wherein each of said magnets is disposed to have its first area lying parallel to the axis of said coil means and wherein said magnets are disposed to have a gap therebetween and further disposed so that said coil means is located within said gap.

2. A mass and coil assembly according to claim 1 wherein there is further included a keeper means to provide a path for magnetic flux from said magnets and wherein said keeper means is disposed to lie along the axis of said coil means.

3. A mass and coil assembly according to claim 1 wherein said coil has a cross section dimension of 0.02 square inches.

* * * * *